(12) United States Patent
Suess

(10) Patent No.: US 12,384,409 B2
(45) Date of Patent: Aug. 12, 2025

(54) SYSTEMS AND TECHNIQUES FOR DETERMINING RANGE AND RANGE-RATE USING TIME-OF-FLIGHT SENSORS

(71) Applicant: GM Cruise Holdings LLC, San Francisco, CA (US)

(72) Inventor: Ryan Suess, Seattle, WA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 280 days.

(21) Appl. No.: 18/183,633

(22) Filed: Mar. 14, 2023

(65) Prior Publication Data
US 2024/0308542 A1    Sep. 19, 2024

(51) Int. Cl.
*B60W 60/00*    (2020.01)
(52) U.S. Cl.
CPC ..... *B60W 60/001* (2020.02); *B60W 2420/403* (2013.01); *B60W 2420/408* (2024.01)
(58) Field of Classification Search
CPC .................................................. B60W 60/001
See application file for complete search history.

(56) References Cited

U.S. PATENT DOCUMENTS

| 11,145,075 | B2* | 10/2021 | Valentin | G06T 7/579 |
| 11,494,927 | B2* | 11/2022 | Guizilini | G06T 3/18 |
| 11,503,221 | B2* | 11/2022 | Yang | G06T 5/50 |
| 2023/0217001 | A1* | 7/2023 | Holzer | H04N 13/366 |
| | | | | 348/36 |
| 2024/0134020 | A1* | 4/2024 | Sweeney | G01S 7/4915 |
| 2024/0134021 | A1* | 4/2024 | Sweeney | G01S 17/894 |
| 2024/0303840 | A1* | 9/2024 | Liu | G06T 7/20 |
| 2024/0308542 | A1* | 9/2024 | Suess | B60W 60/001 |

\* cited by examiner

*Primary Examiner* — Michael A Berns
(74) *Attorney, Agent, or Firm* — CANTOR COLBURN LLP

(57) ABSTRACT

Systems and techniques are provided for determining range and range-rate in time-of-flight sensors. An example method includes determining a first depth map that is based on a first image frame and a second image frame, wherein the first image frame and the second image frame correspond to a first set of image frames received from a time-of-flight sensor; calculating, based on the first depth map, a first set of three-dimensional optical flow data between the first image frame and the second image frame; performing three-dimensional warping of at least one image frame from the first set of image frames using the first set of three-dimensional optical flow data to yield a first realigned image frame; and determining a second depth map that is based on the first realigned image frame.

20 Claims, 6 Drawing Sheets

SYSTEMS AND TECHNIQUES FOR DETERMINING RANGE AND RANGE-RATE USING TIME-OF-FLIGHT SENSORS

BACKGROUND

1. Technical Field

The present disclosure generally relates to autonomous vehicles and, more specifically, to systems and techniques for determining range and range-rate using time-of-flight sensors.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
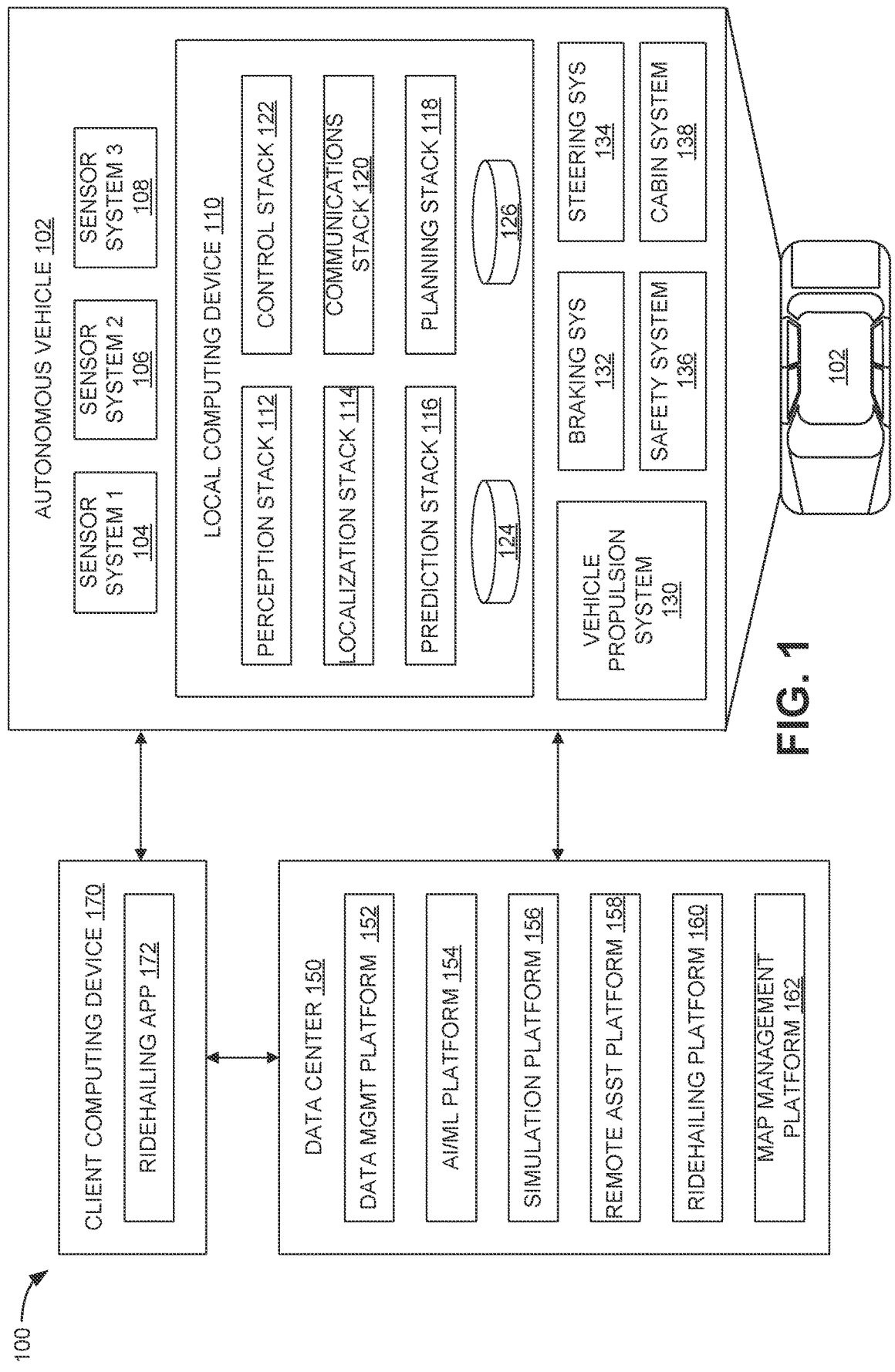
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, an AV may use a time-of-flight sensor (e.g., time-of-flight camera) to measure distance to one or more objects in an environment of the AV. For example, depth data of objects in the environment can be determined based on frames (e.g., images or image frames) that are captured by a time-of-flight sensor. In some cases, the frames or images may be recorded using a temporally patterned illumination profile with a temporally coded aperture (e.g., blinking pixels). Depending on the intensity measurements, the images can be combined to form a depth map or depth image that can be used to determine distance to an object.

However, because the depth image is composed of multiple images that are captured at different times, it is possible that motion between images (e.g., due to sensor movement and/or object movement) will yield a set of images that are different. That is, relative motion between the time-of-flight sensor and the object(s) in the environment can cause pixel misalignment between frames. This pixel misalignment among frames may introduce errors in the depth estimations made using the time-of-flight sensor.

Systems and techniques are provided herein for determining range (e.g., depth or distance) and/or range-rate (e.g., z-axis velocity) using a time-of-flight sensor. In some aspects, the systems and techniques described herein can be used to mitigate the motion artifacts by calculating optical flow among image frames. In some aspects, the optical flow data can be determined using an optical flow constraint equation that includes depth information. In some cases, the depth information can be based on the intensity measurement (e.g., at a particular pixel) that is related to the distance of the object from the time-of-flight sensor.

In some aspects, the systems and techniques described herein can be used to derive optical flow that can include a dependence on range and range-rate. In some instances, the optical flow data can be used to improve the depth map by aligning images in three dimensions. In some cases, the optical flow data can include transverse velocities (e.g., velocities in the x and y direction) and/or range-rate (e.g., velocity in the z direction).

FIG. 1 is a diagram illustrating an example autonomous vehicle (AV) management system 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridehailing service (e.g., a ridesharing service), a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridehailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridehailing service via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the ridehailing application 172 to enable passengers to view the AV 102 in transit en route to a pick-up or drop-off location, and so on.

While the autonomous vehicle 102, the local computing device 110, and the AV management system 100 are shown to include certain systems and components, one of ordinary skill will appreciate that the autonomous vehicle 102, the local computing device 110, and/or the AV management system 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
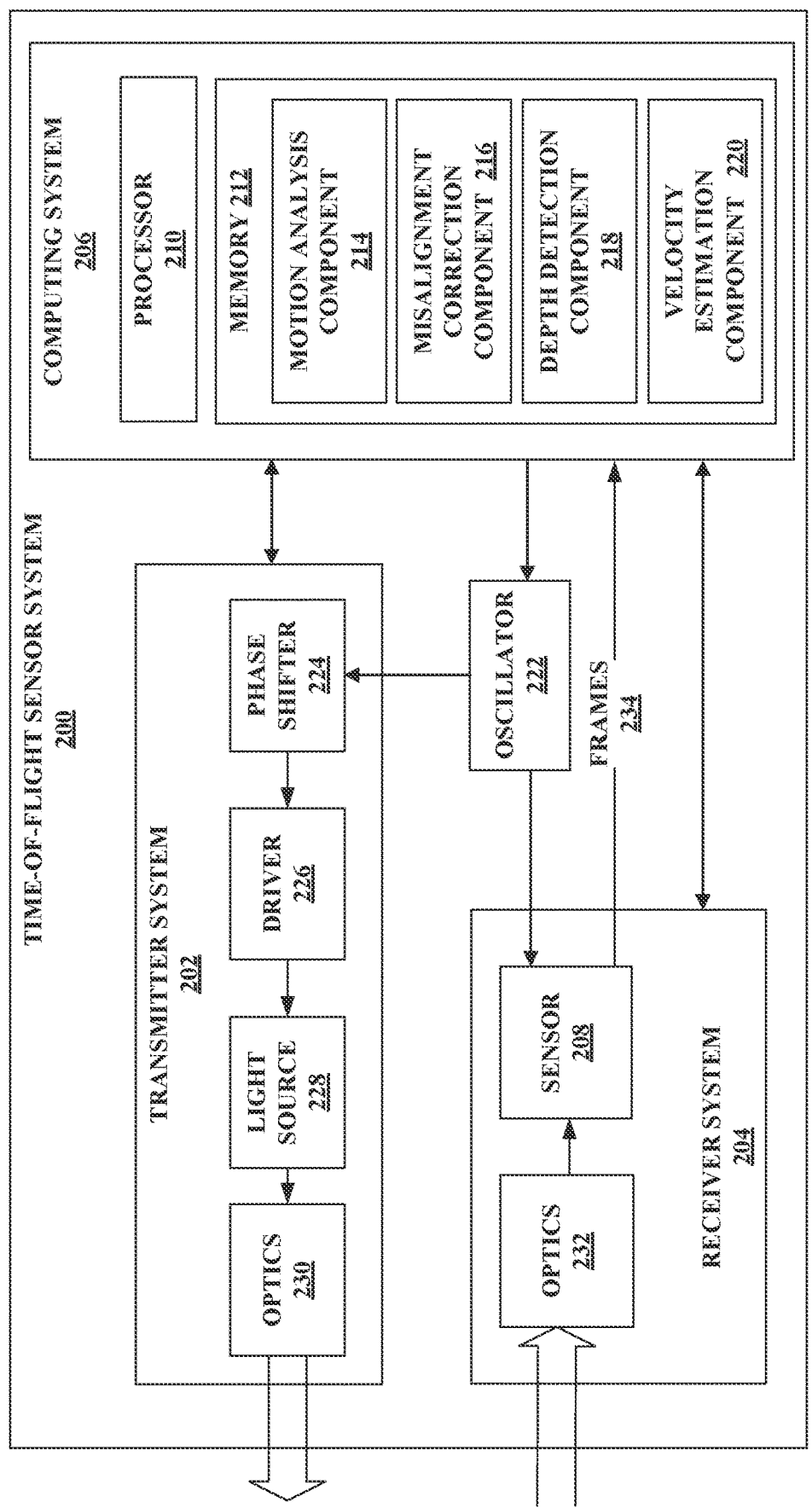
FIG. 2 is a block diagram of an example of a time-of-flight sensor system, in accordance with some examples of the present disclosure.

FIG. 2 is an example of time-of-flight sensor system 200. In some aspects, time-of-flight sensor system 200 can include a transmitter system 202, a receiver system 204, a computing system 206, and/or an oscillator 222. In some cases, transmitter system 202, receiver system 204, computing system 206, and/or oscillator 222 may be incorporated within time-of-flight sensor system 200 or as one or more separate components. For example, computing system 206 may be part of time-of-flight sensor system 200 or computing system 206 can be implemented as one or more separate components that are in communication with time-of-flight sensor system 200.

In some examples, the computing system 206 can include a processor 210 and memory 212, and the memory 212 can include computer-executable instructions that are executed by the processor 210. Pursuant to various examples, the processor 210 can be or can include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like. In some instances, computing system 206 can communicate with transmitter system 202, receiver system 204, and/or oscillator 222. In some aspects, computing system 206 can correspond to processor-based system 600 as described below with respect to FIG. 6.

In some aspects, transmitter system 202 can be configured to send or emit light (e.g., modulated light) into an environment of time-of-flight sensor system 200. In some cases, the light can propagate outwards from the time-of-flight sensor system 200, reflect off of an object in the environment of the time-of-flight sensor system 200, and return back to the time-of-flight sensor system 200 (e.g., return light can be received by receiver system 204, as discussed below).

In some configurations, transmitter system 202 can include phase shifter 224, driver 226, light source 228, and/or optics 230. In some aspects, the phase shifter 224 can be used to delay a clock signal (e.g., radio frequency (RF) clock signal) received from the oscillator 222. For example, phase shifter 224 can delay a clock signal outputted by oscillator 222 relative to the clock signal provided to the sensor 208 (e.g., within receiver system 204) in order to provide a relative phase delay between the transmitter system 202 and the receiver system 204 for a given frame. In some cases, the delayed signal can be inputted to the driver 226 to modulate the light source 228 (e.g., a light emitting diode (LED) or LED array). In some examples, modulated light outputted by the light source 228 can be shaped by the optics 230 and transmitted into an environment of the time-of-flight sensor system 200. That is, in some cases, modulated light transmitted by the transmitter system 202 can include an RF signal (e.g., amplitude modulated signal, an RF-wavefront).

In some instances, the receiver system 204 can include a sensor 208 and/or optics 232, which can be configured to collect the light received (e.g., reflected light corresponding to the transmitted light) at the time-of-flight sensor system 200. In some cases, the light transmitted into the environment (e.g., by transmitter system 202) can be incident upon object(s) in the environment and can back-scatter. In some aspects, returned light carrying three-dimensional information with the RF signal with different time-of-flight delays can be mapped by the optics 232 onto the sensor 208 (e.g., a time-of-flight sensor). Further, the sensor 208 can communicate with the computing system 206. For example, the computing system 206 can control the sensor 208 and/or can receive a stream of frames 234 (e.g., including digitized three-dimensional information) from the sensor 208. As described herein, the computing system 206 can perform various signal processing on the stream of frames 234 to generate an output (e.g., a point cloud, a depth map, etc.).

As noted above, computing system 206 can receive image frames 234 outputted by the sensor 208 of the time-of-flight sensor system 200. In some aspects, the stream of image frames 234 can include one or more image frame sequences. In some examples, an image fame sequence can include one or more image frames having different frame types. In some cases, an image frame type can signify or indicate sensor parameters of the time-of-flight sensor system 200 when the image frame is captured. For instance, the sensor parameters associated with an image frame type can include an illumination state of the time-of-flight sensor system 200 for the frame. In some aspects, the illumination state can indicate whether the time-of-flight sensor system 200 (e.g., the transmitter system 202) is either emitting or is inhibited from emitting light for the frame (e.g., whether the frame is a passive frame or is a frame for which the transmitter system 202 emitted a modulated light signal). In some cases, the sensor parameters can include a relative phase delay between the transmitter system 202 and the receiver system 204 of the time-of-flight sensor system 200 for the frame. In some instances, the sensor parameters of the time-of-flight sensor system 200 for a frame can include an integration time of the sensor 208 of the time-of-flight sensor system 200 for the frame.

In some examples, memory 212 of the computing system 206 can include a motion analysis component 214, a misalignment correction component 216, a depth detection component 218, and/or a velocity estimation component 220. The motion analysis component 214 can identify a pair of frames in the stream of frames 234 received from the sensor 208. In some cases, the pair of frames can be identified a priori based on frame type. In some aspects, the pair of frames may correspond to a pair of non-adjacent frames.

In some examples, the motion analysis component 214 can calculate computed optical flow data based on the pair of frames in the stream of frames 234. The motion analysis component 214 can further generate estimated optical flow data for at least one differing frame other than the pair of frames in the stream of frames 234 based on the computed optical flow data. Moreover, the misalignment correction component 216 can realign the at least one differing frame based on the estimated optical flow data. In some examples, the depth detection component 218 can compute object depth data based on realigned frames in the frame sequence. In some cases, the depth detection component 218 can also output a point cloud or a depth map that includes the object depth data.

In some aspects, the velocity estimation component 220 can generate velocity estimate data for an object in the frames based on the computed optical flow data. The velocity estimate data can include transverse velocity data (e.g., vertical velocity data and/or horizontal velocity data), radial velocity, and/or range-rate (e.g., z-axis velocity data). The transverse velocity estimate data, the radial velocity data, and/or the range-rate data for the object can further be generated by the velocity estimation component 220 based on an area in an environment of the time-of-flight sensor system 200 included in a field of view of the frames. Moreover, the velocity estimation component 220 can generate the velocity estimate data for the object based on object depth data for the object (e.g., generated by the depth detection component 218 based on realigned frames in the frames sequence adjusted by the misalignment correction component 216 as described herein). Pursuant to another example, it is contemplated that the velocity estimation component 220 can additionally or alternatively generate the velocity estimate data for the object based on estimated optical flow data generated by the motion analysis component 214.

Figure 3:
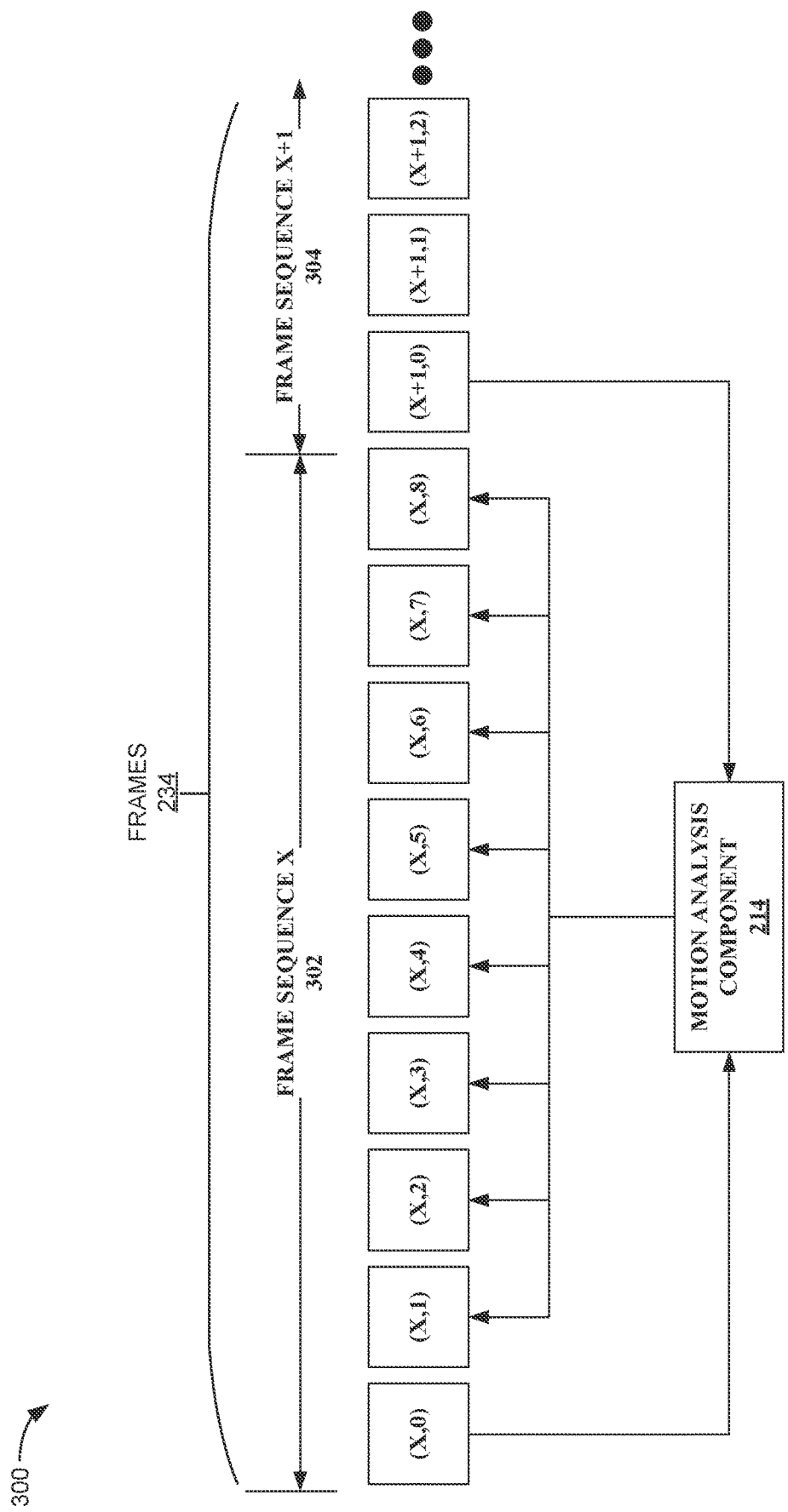
FIG. 3 is a diagram illustrating an example system for determining optical flow among image frames captured using a time-of-flight camera, in accordance with some examples of the present disclosure.

FIG. 3 illustrates an example system 300 for determining optical flow among image frames captured using a time-of-flight camera (e.g., time-of-flight sensor system 200). In some aspects, system 300 can include motion analysis component 214, as discussed above with respect to FIG. 1. In some cases, motion analysis component 214 can receive a stream of frames (e.g., frames 234) that includes one or more frame sequences. As illustrated, stream of frames 234 includes a first frame sequence (e.g., frame sequence X 302) and a portion of a subsequent frame sequence (e.g., frame sequence X+1 304).

In some aspects, frame sequence X 302 can include one or more image frames having a different frame type. For example, one or more image frames in the frame sequence X 302 may be captured by the time-of-flight sensor system 200 using different sensor parameters. As illustrated, frame sequence X 302 includes nine frames: a frame (X,0), a frame (X,1), a frame (X,2), a frame (X,3), a frame (X,4), a frame (X,5), a frame (X,6), a frame (X,7), and a frame (X,8). In some instances, other frame sequences in the stream of frames 234 can be substantially similar to the frame sequence X. For instance, the frame sequence X+1 304 can similarly include nine frames: a frame (X+1,0), a frame (X+1,1), a frame (X+1,2), a frame (X+1,3), a frame (X+1,4), a frame (X+1,5), a frame (X+1,6), a frame (X+1,7), and a frame (X+1,8).

In some aspects, the sensor parameters employed by the time-of-flight sensor system 200 when capturing a first frame in a frame sequence can be the same across frame sequences (e.g., the sensor parameters for the frame (X,0) and the frame (X+1,0) are substantially similar, both are frame type 0), the sensor parameters employed by the time-of-flight sensor system 200 when capturing a second frame in a frame sequence can be the same across frame sequences (e.g., the sensor parameters for the frame (X,1) and the frame (X+1,1) are substantially similar, both are frame type 1), and so forth. While various examples set forth herein describe nine frames being included in a frame sequence of the stream of frames 234, it is to be appreciated that a frame sequence can include two or more frames; thus, the present technology is not limited to frame sequences having any particular number of frames.

In some configurations, a first frame (X,0) in the frame sequence X 302 can be a passive frame with no illumination (e.g., a grayscale frame). Therefore, in some examples, the illumination state of this first frame (X,0) can signify that the time-of-flight sensor system 200 (e.g., the transmitter system 202) is inhibited from emitting light for the frame (X,0). In some cases, the first frame (X,0) can also have a relatively long integration time of the sensor 208. In some aspects, the remaining eight frames in the frame sequence X 302 can be illuminated frames; accordingly, the illumination state for the remaining frames in frame sequence X 302 (e.g., frame (X,1) through frame (X,8)) can signify that the time-of-flight sensor system 200 (e.g., the transmitter system 202) emits light for such frames. Moreover, the frames (X,1)-(X,8) can have different combinations of relative phase delays between the transmitter system 202 and the receiver system 204 of the time-of-flight sensor system 200 and integration times of the sensor 208.

For instance, in some examples, the second frame (X,1) in the frame sequence X 302 can have a 0° relative phase delay between the transmitter system 202 and the receiver system 204, and the relatively long integration time for the sensor 208. In another cases, the third frame (X,2) in the frame sequence X 302 can have a 90° relative phase delay between the transmitter system 202 and the receiver system 204, and the relatively long integration time of the sensor 208. In some instances, the fourth frame (X,3) in the frame sequence X 302 can have a 180° relative phase delay between the transmitter system 202 and the receiver system 204, and the relatively long integration time of the sensor 208. In some aspects, the fifth frame (X,4) in the frame sequence X 302 can have a 270° relative phase delay between the transmitter system 202 and the receiver system 204, and the relatively long integration time of the sensor 208. In some cases, the sixth frame (X,5) in the frame sequence X 302 can have a 0° relative phase delay between the transmitter system 202 and the receiver system 204, and a relatively short integration time of the sensor 208. In some configurations, the seventh frame (X,6) in the frame sequence X 302 can have a 90° relative phase delay between the transmitter system 202 and the receiver system 204, and the relatively short integration time of the sensor 208. In some examples, the eighth frame (X,7) in the frame sequence X 302 can have a 180° relative phase delay between the transmitter system 202 and the receiver system 204, and the relatively short integration time of the sensor 208. In some cases, the ninth frame (X,8) in the frame sequence X 302 can have a 270° relative phase delay between the transmitter system 202 and the receiver system 204, and the relatively short integration time of the sensor 208.

In some aspects, the frames in a frame sequence (e.g., frame sequence X 302) can be captured by the time-of-flight sensor system 200 over a period of time on the order of milliseconds or tens of milliseconds (e.g., between 1 millisecond and 100 milliseconds, between 10 milliseconds and 100 milliseconds). In some instances, the period of time over which the frames of the frame sequence are captured as well as the relative motion between the time-of-flight sensor system 200 and object(s) in a scene can lead to misalignment between pixels of the frames (or portions thereof).

In some examples, motion analysis component 214 can mitigate the effects of motion artifacts by determining optical flow data among image frames and using the optical flow data to adjust (e.g., warp, align, etc.) one or more other image frames in the stream of frames 234. For example, in some aspects, the motion analysis component 214 can calculate computed optical flow data based on a pair of frames. In some examples, the pair of frames used to calculate optical flow data may be non-adjacent frames. In some cases, the pair of frames used to calculate optical flow data may be part of a single frame sequence (e.g., both frames are part of frame sequence X 302) or of different frame sequences (e.g., one frame is from frame sequence X 302 and the other is from frame sequence X+1 304). In some aspects, the motion analysis component 214 can estimate optical flow data for at least one differing frame other than the pair frames in the stream of frames 234 based on the computed optical flow data.

As illustrated in FIG. 3, motion analysis component 214 may calculate optical flow using frame (X,0) and frame (X+1,0). That is, the motion analysis component 214 can identify a pair of non-adjacent frames in the stream of frames 234 that are of the same frame type. More particularly, the pair of frames in the stream of frames 234 identified by the motion analysis component 214 can include successive passive frames for which the time-of-flight sensor system 200 is inhibited from emitting light (e.g., the frame (X,0) and the frame (X+1,0) are successive grayscale frames in the stream of frames from successive frame sequences).

In some aspects, motion analysis component 214 can generate estimated optical flow data for at least one differing frame other than the pair of frames used to calculate optical flow (e.g., frame (X,0) and frame (X+1,0)). For instance, estimated optical flow data for the frames (X,1)-(X,8) can be interpolated based on the computed optical flow data (e.g., calculated based on the frames (X,0) and (X+1,0))

According to some aspects, the motion between a pair of frames can be assumed to be linear (e.g., the motion analysis component 214 can linearly interpolate the estimated optical flow data). However, in other examples, it is contemplated that the motion can be modeled in a non-linear manner (e.g., acceleration can be modeled as part of the interpolation performed by the motion analysis component 214).

Further details regarding calculation of optical flow data are disclosed in U.S. patent application Ser. No. 17/970,518, filed on Oct. 20, 2022, for "Time-of-Flight Motion Misalignment Artifact Correction," which is incorporated herein by reference.

In some examples, a conservation equation for optical flow with deterministic intensity variation may be given by Equation (1) below, in which the recorded value $I_k$ can have units of DN (or electrons) and corresponds to the recorded value for the $k^{th}$ measurement taken at time $t+k\Delta t$ where k is an integer; the function $C_k$ can be dimensionless and can correspond to the range dependent known correlation function that arises in time-of-flight imaging and is a function of the modulation waveform and value of the phase shift provided by phase shifter 224; Z can correspond to the unknown range in scene coordinates; and x and y can correspond to image coordinates.

$$\frac{I_k(x, y, Z; t)}{C_k(x, y, Z; t)} = \frac{I_{k+1}(x + \Delta x, y + \Delta y, Z + \Delta Z; t + \Delta t)}{C_{k+1}(x + \Delta x, y + \Delta y, Z + \Delta Z; t + \Delta t)} \quad (1)$$

In some cases, the recorded or measured value for $I_k$ can be separated into a component that depends on range, $C_k(Z(x, y; t))$, and the image amplitude, $A(x, y; t)$, with units of DN (or electron number). In some aspects, Equation (1) may be rewritten as Equation (2) below, which illustrates that image amplitude $A(x, y; t)$ is the conserved quantity.

$$I_k(x, y, Z; t) = A(x, y; t)C_k(Z(x, y; t)) \quad (2)$$

In some aspects, Equation (3) below can be used to determine optical flow. In some cases, optical flow may be determined by assuming the same or similar brightness levels among image frames.

$$A(x, y; t) = A(x + \Delta x, y + \Delta y; t + \Delta t) \quad (3)$$

In some cases, while amplitude is the conserved quantity, amplitude may not be accessible to the motion analysis component 214 (e.g., amplitude is not available through measurement). In some aspects, Equation (3) may be rewritten in terms of observables $I_k$ and $I_{k+1}$ and their relationship with the amplitude via the known correlation functions. In some instances, Equation (1) can be manipulated to yield Equation (4) below, which can be written in terms of the unknown velocity and range parameters, as follows:

$$I_k(x, y, Z; t)C_{k+1}(x + \Delta x, y + \Delta y, Z + \Delta Z; t + \Delta t) = \quad (4)$$
$$I_{k+1}(x + \Delta x, y + \Delta y, Z + \Delta Z; t + \Delta t)C_k(Z(x, y; t))$$

In some cases, the value of the function due to a small perturbation may be approximated to yield Equation (5). It is noted that the following shorthand is used herein for the partial derivative, $$\frac{\partial}{\partial q} f = f^{(q)}$$

for some function $f$ and variable of interest q.

$$I_k\left(C_{k+1} + C_{k+1}^{(x)}\Delta x + C_{k+1}^{(y)}\Delta y + C_{k+1}^{(Z)}\Delta Z + C_{k+1}^{(t)}\Delta t\right) = \quad (5)$$
$$\left(I_{k+1} + I_{k+1}^{(x)}\Delta x + I_{k+1}^{(y)}\Delta y + I_{k+1}^{(Z)}\Delta Z + I_{k+1}^{(t)}\Delta t\right)C_k$$

In some instances, the expression $I_{k+1}C_k$ can be subtracted from each side of Equation (4) and the expression $C_k\Delta t$ can be divided through Equation (4) to yield Equation (6A), as follows:

$$\nabla_\perp I_{k+1} \cdot \overline{v}_\perp + I_{k+1}^{(Z)} v_Z + I_{k+1}^{(t)} = \frac{I_k}{C_k}\left[\nabla C_{k+1} \cdot \overline{v}_\perp + C_{k+1}^{(Z)} v_Z + C_{k+1}^{(t)}\right] \quad (6A)$$

It is noted that the above makes use of the expression from Equation (6B) below which is found using Equation (2) and noting that $C_{k+1}C_k = C_k C_{k+1}$.

$$I_{k+1}C_k - I_k C_{k+1} = A(C_{k+1}C_k - C_k C_{k+1}) \quad (6B)$$
$$= 0$$

In some cases, the derivative of the left-hand side (LHS) of Equation (6A) may be examined as per Equation (7) where q can be replaced with x, y, t or another variable of interest.

$$\frac{\partial I_{k+1}}{\partial q} = A^{(q)}C_{k+1} + AC_{k+1}^{(q)} \quad (7)$$

In some aspects, the partial derivative with respect to Z is unique because A has no Z dependence, yielding Equation (8) as follows:

$$\frac{\partial I_{k+1}}{\partial Z} = AC_{k+1}^{(Z)} \quad (8)$$

In some examples, based on Equation (2) and the right-hand side (RHS) of Equation 6, it may be noted that $$A = \frac{I_k}{C_k}.$$

Thus, in some cases, Equation (6) can be rewritten as Equation (9).

$$\tilde{\nabla}_\perp A \cdot \tilde{v}_\perp + A^{(t)} = 0 \qquad (9)$$

In some aspects, Equation (9) may correspond to a standard optical flow constraint equation (e.g., motion analysis component 214 may use Equation (9) to determine optical flow). In some cases, Equation (9) may be evaluated by using $I_k/C_k$ in place of A (e.g., because motion analysis component 214 does not have access to A). For example, the derivatives of A with respect to some variable can yield the relation in Equation (10), as follows:

$$\frac{\partial A}{\partial q} = \frac{\partial}{\partial q}\left\{\frac{I_k}{C_k}\right\} = \frac{I_k^{(q)} C_k - I_k C_k^{(q)}}{C_k^2} \qquad (10)$$

Based on the result from Equation (10), Equation (9) can be used to derive Equation (11), as follows:

$$\left(I_k^{(x)} C_k - I_k C_k^{(x)}\right) v_x + \left(I_k^{(y)} C_k - I_k C_k^{(y)}\right) v_y + \left(I_k^{(t)} C_k - I_k C_k^{(t)}\right) = 0 \qquad (11)$$

It is noted that $I_k$ values can be determined via measurement (e.g., by time-of-flight sensor system 200), which is designated herein using a tilde (e.g., $I_k \rightarrow \tilde{I}_k$). Further, in some cases, $C_k$ and its derivatives can be found through an estimation process because they depend on an unknown depth parameter. Based on this, Equation (11) can be written as Equation (12) below.

$$\left(\tilde{I}_k^{(x)} v_x + \tilde{I}_k^{(y)} v_y + \tilde{I}_k^{(t)}\right) C_k - \left(C_k^{(x)} v_x + C_k^{(y)} v_y + C_k^{(t)}\right) \tilde{I}_k = 0 \qquad (12)$$

As noted above, the terms with the tilde in Equation (12) are known values from measurement (e.g., from time-of-flight sensor system 200). In some aspects, the remaining terms of Equation (12) can be determined using estimation. In some examples, Equation (12) may divided by the term $C_k \tilde{I}_k$, to yield Equation (13), as follows:

$$\left(\underline{\tilde{I}}_k^{(x)} v_x + \underline{\tilde{I}}_k^{(y)} v_y + \underline{\tilde{I}}_k^{(t)}\right) - \left(\underline{C}_k^{(x)} v_x + \underline{C}_k^{(y)} v_y + \underline{C}_k^{(t)}\right) = 0 \qquad (13)$$

The notation from Equation (14) and the notation from Equation (15) (listed below) are used in Equation (13).

$$\underline{\tilde{I}}_k^{(q)} = \frac{\partial}{\partial q}\{\ln(I_k)\} \qquad (14)$$

$$\underline{C}_k^{(q)} = \frac{\partial}{\partial q}\{\ln(C_k)\} \qquad (15)$$

In some cases, the variable q (e.g., as used in Equation (14) and Equation (15)) may correspond to a generic variable. In some examples, q may be replaced with x, y, t, or some other variable of interest. In some instances, the foregoing equations can be rewritten more succinctly by employing the gradient operator and dot product, yielding Equation (16) as follows:

$$\left(\nabla_\perp \underline{\tilde{I}}_k - \nabla_\perp \underline{C}_k\right) \cdot \tilde{v}_\perp + \underline{\tilde{I}}_k^{(t)} - \underline{C}_k^{(t)} = 0 \qquad (16)$$

In some aspects, Equation (16) can be further developed by evaluating the derivatives of the correlation function $C_k(Z(x, y; t))$, where $Z(x, y; t)$ can correspond to a two dimensional depth image at time t. In some cases, the temporal derivative can be determined as follows:

$$\underline{C}_k^{(t)} = \frac{\partial}{\partial t} \ln(C_k(Z(x, y; t))) \qquad (17)$$

$$= \frac{1}{C_k(Z(x, y; t))} \frac{\partial}{\partial Z} C_k(Z(x, y; t)) \frac{\partial}{\partial t} Z(x, y; t) \qquad (18)$$

$$= \underline{C}_k^{(Z)} \epsilon_Z \qquad (19)$$

Based on Equations (17)-(19), it follows that $\underline{C}_k^{(Z)} = C_k^{(Z)}/C_k$. In some aspects, the spatial derivatives can be evaluated in a similar manner, as follows:

$$\underline{C}_k^{(x,y)} = \frac{\partial}{\partial x, y} \ln(C_k(Z(x, y; t))) \qquad (20)$$

$$= \frac{1}{C_k(Z(x, y; t))} \frac{\partial}{\partial Z} C_k(Z(x, y; t)) \frac{\partial}{\partial x, y} Z(x, y; t) \qquad (21)$$

$$= \underline{C}_k^{(Z)} Z^{(x,y)} \qquad (22)$$

In some aspects, the prior constraint equation can be written as Equation (23) below.

$$\left(\underline{C}_k^{(Z)} \nabla_\perp Z - \nabla_\perp \underline{\tilde{I}}_k\right) \cdot \tilde{v}_\perp + \underline{C}_k^{(Z)} v_Z = \underline{\tilde{I}}_k^{(t)} \qquad (23)$$

In some examples, Equation (23) may be cast into the form illustrated below as Equation (24), which corresponds to an equation that may be solved (e.g., by motion analysis component 214) using a linear least squares approach if an estimate for Z is available.

$$\left[\underline{C}_k^{(Z)} Z^{(x)} = \underline{\tilde{I}}_k^{(x)}\right] v_z + \left[\underline{C}_k^{(Z)} Z^{(y)} = \underline{\tilde{I}}_k^{(y)}\right] v_y + \left[\underline{C}_k^{(Z)}\right] v_z = \underline{\tilde{I}}_k^{(t)} \qquad (24)$$

In some aspects, Equation (24) may hold for a single pixel from an image frame. In some examples, the unknowns from Equation (24) (e.g., $\underline{v}$ and Z) may be solved by considering multiple pixels simultaneously. In some cases, Equation (24) may be solved by assuming that multiple pixels are similar enough such that they correspond to similar unknowns but sufficiently different such that the set of equations generated from considering more than a single pixel will be linearly independent. That is, in some aspects, the equations may be over-determined by considering multiple pixels simultaneously.

In some instances, the $\underline{\tilde{I}}_k$ terms in Equation (24) may be determined from measurement (e.g., by time-of-flight sensor system 200). In some examples, these functions may be 2-dimensional array of values (e.g., $\hat{\underline{I}}_k(x, y; t)$) corresponding to the pixel locations of the time-of-flight imaging sensor. In some configurations, the 2D array can be the native measurement of the time-of-flight camera (e.g., measurement is accessible to motion analysis component 214).

In some aspects, the function $\underline{C}_k^{(Z)}$ from Equation (24) may be relatively well-known. For example, the function $C_k(Z)$ can correspond to the correlation function of the time-of-flight sensor and can have a value that depends on the range of the object. In one illustrative example corresponding to the "4-bucket" technique, the correlation function can be proportional to sin (aZ) or cos (aZ), in which a can correspond to a real-valued scaling constant. In further examples corresponding to different types of coding schemes, the correlation function may be different and known.

In some cases, the correlation function and/or its derivatives may be evaluated based on the depth value of the pixel, which is stored in the depth map $Z(x, y; t)$. In some examples, $\underline{C}_{,j}^Z(Z(x,y;t))$ may be evaluated using a previously estimated depth map $Z(x, y; t-1)$. In some instances, the function $Z^{(x,y)}(x, y; t)$ from Equation (24) can be evaluated using the value from the previous time step.

In some examples, the term $\hat{\underline{I}}_k^{(t)}$ from Equation (24) may correspond to a temporal derivative that may be evaluated by considering two measurements of the same type, k. In some instances, the two measurements of the same type k can correspond to measurements that have been obtained at different moments in time. In some cases, these values can be obtained by measurement using time-of-flight sensor system 200 (e.g., similar to the other $\hat{\underline{I}}_k$ terms in Equation (24)).

Figure 4:
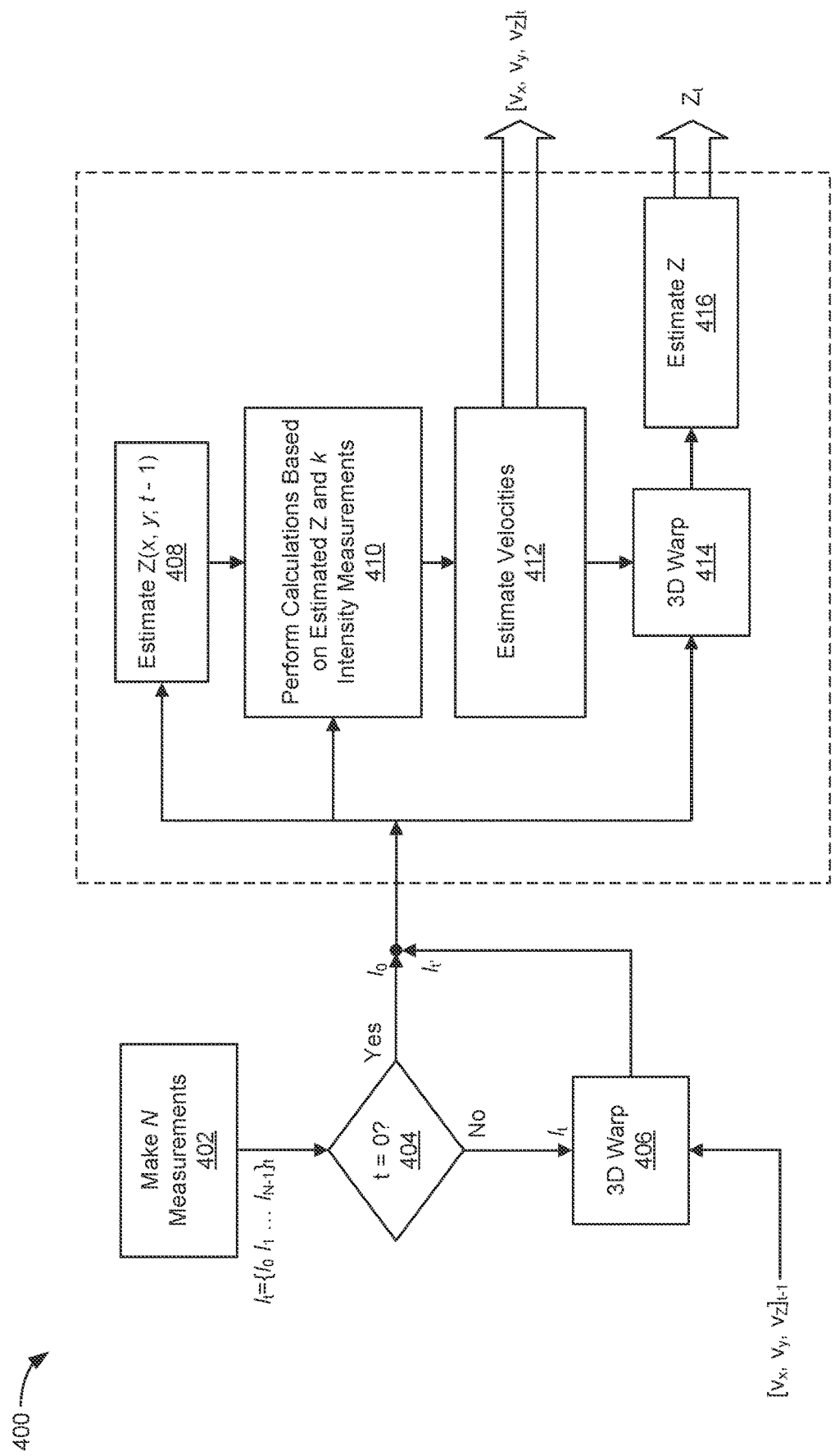
FIG. 4 is a flowchart illustrating an example process for determining range and/or range-rate using a time-of-flight sensor, in accordance with some examples of the present disclosure.

FIG. 4 illustrates a method 400 that may be used to determine range and/or range-rate using time-of-flight sensors. In some examples, the method 400 may be implemented by a time-of-flight sensor system such as time-of-flight sensor system 200 or one or more components thereof (e.g., motion analysis component 214). In some cases, the method 400 may be used to solve Equation (24), as listed above.

At step 402, a set of N measurements can be obtained (e.g., using time-of-flight sensor system 200) for the intensity values starting at time t and concluding at time t+NΔt (e.g., $\tilde{I}_0(x, y; t), \tilde{I}_1(x, y; t+\Delta t), \ldots, \tilde{I}_{N-1}(x, y; t+N\Delta t)$). As a matter of notational convention, the duration of the N measurements, NΔt, can be denoted to occur in a single time step (e.g., NΔt=1) so that quantities derived from N measurements occurring between t and t+NΔt, will be referred to as taking place at time t, and those taking place between times t+NΔt and t+2NΔt, for example, will be referred to as taking place at time t+1.

At step 404, the method can include determining (e.g., by the motion analysis component 214) whether the intensity measurements correspond to an initial set of image frames (e.g., a first set of image frames captured during the first measurement cycle) or whether the intensity measurements correspond to a subsequent set of image frames captured after the initial set of image frames.

In some cases, when the intensity measurements correspond to an initial set of N image frames, the method 400 may proceed to step 408 for making a first estimate of the depth map Z (e.g., $Z_0=Z(x, y; t=0)$). In some aspects, the depth map Z can be determined using any suitable method that converts intensity measurements to a depth map. In one illustrative example, the "4-bucket" method may be used to determine the depth map Z using Equation (25), as follows:

$$Z \propto \arctan\left(\frac{\tilde{I}_3 - \tilde{I}_1}{\tilde{I}_2 - \tilde{I}_0}\right) \quad (25)$$

In some aspects, each measurement from Equation (25) may be given by $\tilde{I}_{3,1} \sim \pm \sin(aZ)$ and $\tilde{I}_{2,0} \sim \pm \cos(aZ)$.

At step 410, the method 400 can include performing various calculations based on the depth map Z and the N intensity measurements (e.g., at time t=0 or at a subsequent time t). In some examples, the calculations performed at step 410 for the $k^{th}$ measurement may include determining one or more of $\underline{C}_k^{(Z)}$; $Z^{(x,y)}$; $\tilde{I}_k^{(x,y)}$; and/or $\tilde{I}_k^{(t)}$ (e.g., using one or more of the equations presented herein).

At step 412, the method 400 can include determining one or more velocities (e.g., transverse velocity $v_x$, transverse velocity $v_y$, and/or range-rate $v_Z$). In some instances, Equation (24) may be over-determined by considering three or more pixels so that unique values can be determine for each of the velocities (e.g., $v_x$, $v_y$, $v_Z$). In some cases, the transverse velocities can be used to perform warping (e.g., alignment based on optical flow at steps 406 and/or 414). In some cases, the range-rate can indicate how an object moves in range (e.g., along the z-axis).

In some examples, the velocities determined at step 412 (e.g., $v_x$, $v_y$, $v_Z$) can be used to perform 3D warping at step 414 and/or at step 406. The 3D warping at step 406 can be performed when the intensity measurements correspond to an image frame that is subsequent to time t=0.

In some cases, the 3D warping (e.g., step 406 and/or step 414) can correspond to a transformation algorithm used in traditional 2D optical flow. For example, the 3D warp can take the velocity map generated from solving the optical flow constraint equation (e.g., the transverse velocities) and locally deform an image to account for pixel motion in the image. In some cases, if the motion is known between two image frames, then one of the image frames can be warped to make the image frames equal (e.g., within a tolerance value). In some instances, the warping step may be performed prior to estimating the range because similar images (e.g., corrected based on optical flow) will include fewer motion artifacts and yield a more accurate depth map.

In some aspects, the 3D warping (e.g., step 406 and/or step 414) may also incorporate the range-rate (e.g., $v_Z$). That is, optical flow data can be used to transform an image along the z-axis such that the brightness value corresponds to the situation where all measurements were acquired at the same or substantially similar time (e.g., the same Z value). In some cases, compensating image frames in the z-axis (e.g., in addition to the x and y directions) can improve range accuracy and remove artifacts produced by motion.

At step 416, the method 400 can include determining the depth map Z based on the 3D warp performed at step 414. As noted above, determining the depth map after correcting images using 3D optical flow data can yield more accurate range (e.g., distance) measurements.

Figure 5:
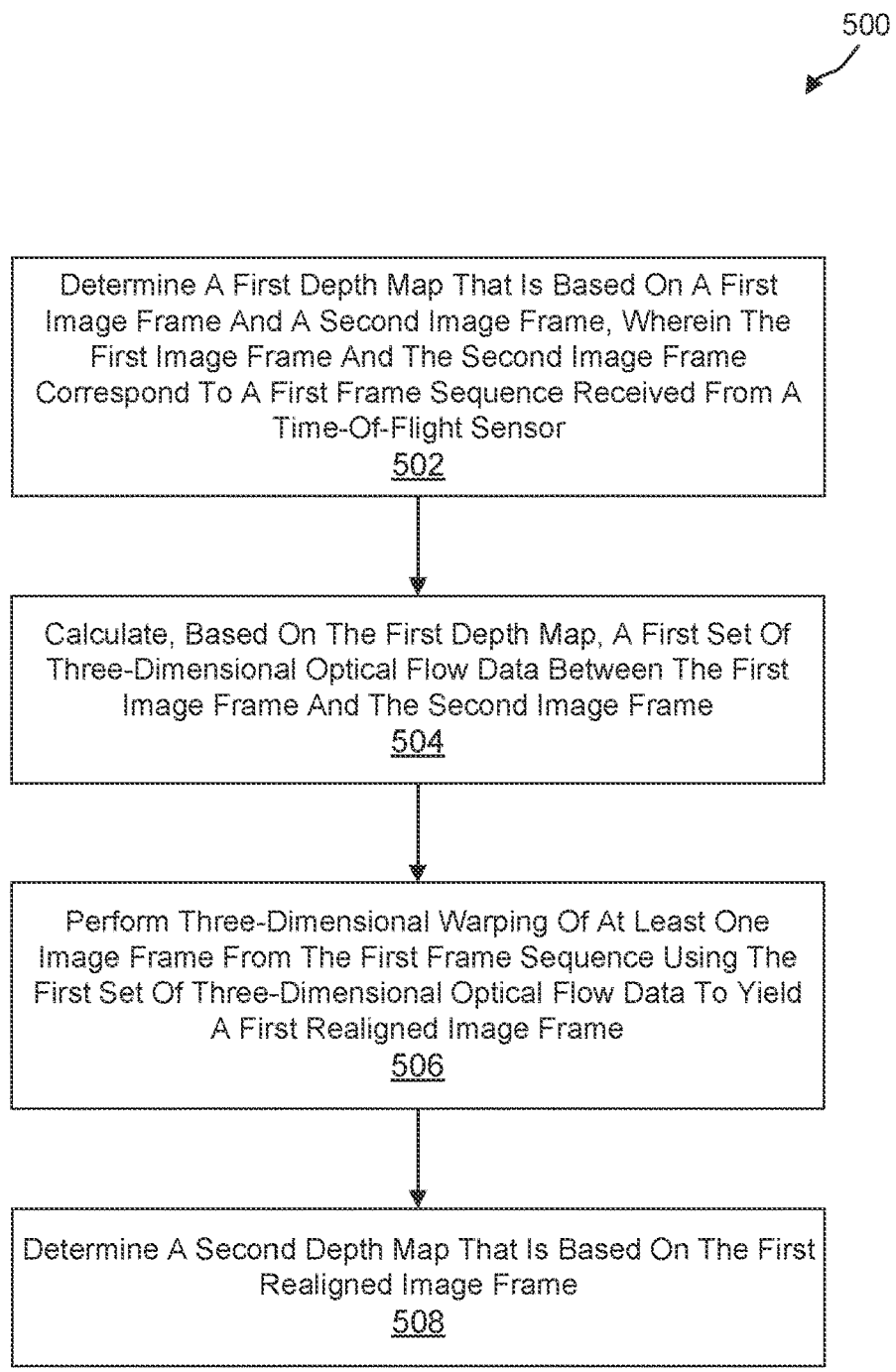
FIG. 5 is a flowchart illustrating another example process for determining range and/or range-rate using a time-of-flight sensor, in accordance with some examples of the present disclosure.

FIG. 5 illustrates an example of a process 500 for determining range and/or range-rate using a time-of-flight sensor. At block 502, the process 500 includes determining a first depth map that is based on a first image frame and a second image frame, wherein the first image frame and the second image frame correspond to a first frame sequence received from a time-of-flight sensor. In some aspects, the first image frame and the second image frame may correspond to non-adjacent image frames in the first frame sequence. For example, motion analysis component 214 can determine a first depth map that is based on a first image frame (e.g., frame (X,0)) and a second image frame (e.g., frame (X,7)) from frame sequence X 302. In further examples, the first image frame and the second image frame may correspond to different frame sequences.

In some cases, the first image frame may be associated with a first set of one or more sensor parameters and the second image frame may be associated with a second set of the one or more sensor parameters. For example, image frame (X,0) may be associated with a first set of sensor parameters and image frame (X,7) may be associated with a second set of sensor parameters. In some aspects, the one or more sensor parameters include at least one of an illumination state associated with the time-of-flight sensor, a phase delay associated with the time-of-flight sensor, and an integration time associated with the time-of-flight sensor.

At block 504, the process 500 includes calculating, based on the first depth map, a first set of three-dimensional optical flow data between the first image frame and the second image frame. In some examples, the first set of three-dimensional optical flow data can include a transverse velocity and a z-axis (or radial) velocity. For instance, motion analysis component 214 can determine a first set of optical flow data (e.g., transverse velocities and z-axis velocity) based on the first depth map.

At block 506, the process 500 includes performing three-dimensional warping of at least one image frame from the first frame sequence using the first set of three-dimensional optical flow data to yield a first realigned image frame. For example, motion analysis component 214 can perform 3D warping of at least one image frame from frame sequence X 302 to yield a realigned image frame. In some instances, the first realigned image frame can correspond to an intermediate image frame between the first image frame and the second image frame. For example, the first realigned image frame may correspond to image frame (X,1) that is between image frame (X,0) and image frame (X,7). In some cases, the first realigned image frame can correspond to a successive image frame that is subsequent to the second image frame. For instance, the first realigned image frame may correspond to image frame (X,8) that is subsequent to image frame (X,7).

At block 508, the process 500 includes determining a second depth map that is based on the first realigned image frame. For instance, motion analysis component 214 can determine a second depth map that is based on one or more image frames from frame sequence X 302 that have been corrected using the optical flow data (e.g., corrected in x, y, and z directions). In some aspects, the 3D optical flow data and depth estimate (e.g., depth map) from the first set of frames can be used on a subsequent set of frames to produce an improved depth estimate and 3D optical flow.

In some examples, the process 500 can include determining a distance between an object and an autonomous vehicle based on the second depth map, wherein the time-of-flight sensor is coupled to the autonomous vehicle. For example, motion analysis component 214 can determine a distance between an object and autonomous vehicle 102 based on the second depth map.

In some examples, the process 500 can include performing three-dimensional warping of at least one image frame from a second frame sequence using the first set of three-dimensional optical flow data to yield a second realigned image frame, wherein the second frame sequence is subsequent to the first frame sequence. For instance, motion analysis component 214 can perform 3D warping (e.g., as described in step 404 of method 400) of at least one frame in frame sequence X+1 304 using the first set of three-dimensional optical flow data.

In some cases, the process 500 can include determining a third depth map that is based on the second realigned image frame. For example, motion analysis component 214 can determine a third depth map that is based on the second realigned image frame from frame sequence X+1 304.

In some aspects, the process 500 can include calculating, based on the third depth map, a second set of three-dimensional optical flow data between the second image frame and a third image frame corresponding to the second frame sequence. For instance, motion analysis component 214 can determine a second set of 3D optical flow data between the second image frame and a third image frame from frame sequence X+1 304 (e.g., as described in step 412 of method 400).

In some instances, the process 500 can include performing three-dimensional warping of at least one image frame from the second frame sequence using the second set of three-dimensional optical flow data to yield a third realigned image frame and determining a fourth depth map that is based on the third realigned image frame. For example, motion analysis component 214 can perform 3D warping of at least one image frame from frame sequence X+1 304 using the second set of 3D optical flow data (e.g., as described in steps 414 and 416 of method 400). Those skilled in the art will recognize that one or more of the steps associated with process 500 may be repeated and/or omitted. For example, in some cases, steps from the process 500 may be repeated as new frames become available.

Figure 6:
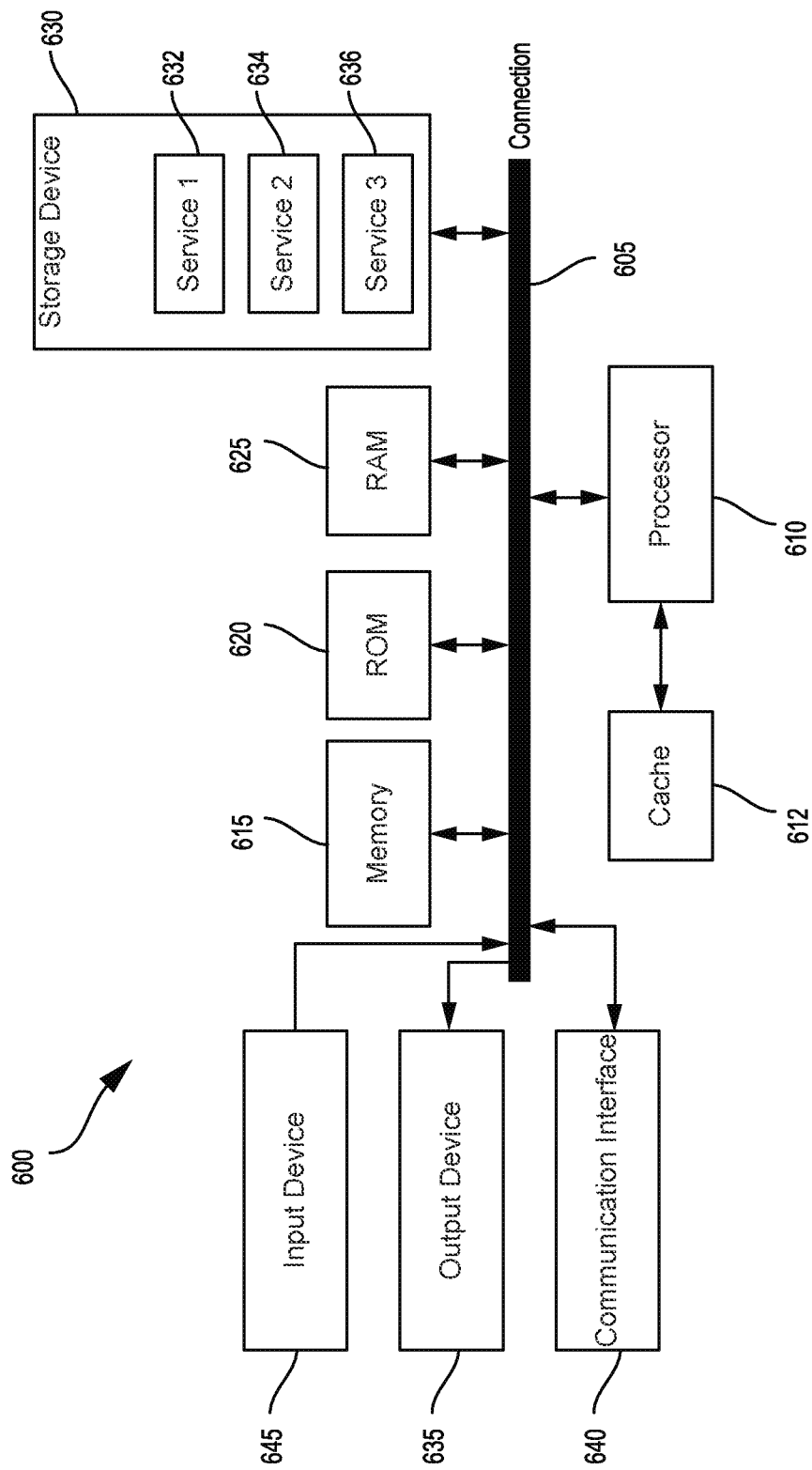
FIG. 6 is a diagram illustrating an example system architecture for implementing certain aspects described herein.

FIG. 6 illustrates an example processor-based system with which some aspects of the subject technology can be implemented. For example, processor-based system 600 can be any computing device making up internal computing system 110, a passenger device executing the ridehailing application 172, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 can include an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a BLU-RAY™ disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, causes the system to perform a function. In some examples, a hardware service that performs a particular function can include the software component stored in a computer-readable medium in connection with the necessary hardware components, such as processor 610, connection 605, output device 635, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Selected Examples

Illustrative examples of the disclosure include:

Aspect 1. A method comprising: determining a first depth map that is based on a first image frame and a second image frame, wherein the first image frame and the second image frame correspond to a first set of image frames received from a time-of-flight sensor; calculating, based on the first depth map, a first set of three-dimensional optical flow data between the first image frame and the second image frame; performing three-dimensional warping of at least one image frame from the first set of image frames using the first set of three-dimensional optical flow data to yield a first realigned image frame; and determining a second depth map that is based on the first realigned image frame Aspect 2. The method of Aspect 1, further comprising: performing three-dimensional warping of at least one image frame from a second set of image frames using the first set of three-dimensional optical flow data to yield a second realigned image frame, wherein the second frame sequence is subsequent to the first frame sequence; determining a third depth map that is based on the second realigned image frame; calculating, based on the third depth map, a second set of three-dimensional optical flow data between the second image frame and a third image frame corresponding to the second frame sequence; performing three-dimensional warping of at least one image frame from the second set of image frames using the second set of three-dimensional optical flow data to yield a third realigned image frame; and determining a fourth depth map that is based on the third realigned image frame.

Aspect 3. The method of any of Aspects 1 to 2, wherein the first image frame and the second image frame correspond to non-adjacent image frames in the first set of image frames.

Aspect 4. The method of any of Aspects 1 to 3, wherein the first image frame is associated with a first set of one or more sensor parameters and the second image frame is associated with a second set of the one or more sensor parameters.

Aspect 5. The method of Aspect 4, wherein the one or more sensor parameters include at least one of an illumination state associated with the time-of-flight sensor, a phase delay associated with the time-of-flight sensor, and an integration time associated with the time-of-flight sensor.

Aspect 6. The method of any of Aspects 1 to 5, wherein the first set of three-dimensional optical flow data includes a transverse velocity and a z-axis velocity.

Aspect 7. The method of any of Aspects 1 to 6, wherein the first realigned image frame corresponds to an intermediate image frame between the first image frame and the second image frame.

Aspect 8. The method of any of Aspects 1 to 7, wherein the first realigned image frame corresponds to a successive image frame that is subsequent to the second image frame.

Aspect 9. The method of any of Aspects 1 to 8, further comprising: determining a distance between an object and an autonomous vehicle based on the second depth map, wherein the time-of-flight sensor is coupled to the autonomous vehicle.

Aspect 10. An apparatus comprising: at least one memory; and at least one processor coupled to the at least one memory, wherein the at least one processor is configured to perform operations in accordance with any one of Aspects 1 to 9.

Aspect 11. An apparatus comprising means for performing operations in accordance with any one of Aspects 1 to 9.

Aspect 12. A non-transitory computer-readable medium comprising instructions that, when executed by an apparatus, cause the apparatus to perform operations in accordance with any one of Aspects 1 to 9.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:
1. An apparatus comprising:
   at least one memory comprising instructions; and at least one processor configured to execute the instructions and cause the at least one processor to:
determine a first depth map that is based on a first image frame and a second image frame, wherein the first image frame and the second image frame correspond to a first frame sequence received from a time-of-flight sensor;
calculate, based on the first depth map, a first set of three-dimensional optical flow data between the first image frame and the second image frame;
perform three-dimensional warping of at least one image frame from the first frame sequence using the first set of three-dimensional optical flow data to yield a first realigned image frame; and
determine a second depth map that is based on the first realigned image frame.

2. The apparatus of claim 1, wherein the at least one processor is further configured to:
perform three-dimensional warping of at least one image frame from a second frame sequence using the first set of three-dimensional optical flow data to yield a second realigned image frame, wherein the second frame sequence is subsequent to the first frame sequence;
determine a third depth map that is based on the second realigned image frame;
calculate, based on the third depth map, a second set of three-dimensional optical flow data between the second image frame and a third image frame corresponding to the second frame sequence;
perform three-dimensional warping of at least one image frame from the second frame sequence using the second set of three-dimensional optical flow data to yield a third realigned image frame; and
determine a fourth depth map that is based on the third realigned image frame.

3. The apparatus of claim 1, wherein the first image frame and the second image frame correspond to non-adjacent image frames in the first frame sequence.

4. The apparatus of claim 1, wherein the first image frame is associated with a first set of one or more sensor parameters and the second image frame is associated with a second set of the one or more sensor parameters.

5. The apparatus of claim 4, wherein the one or more sensor parameters include at least one of an illumination state associated with the time-of-flight sensor, a phase delay associated with the time-of-flight sensor, and an integration time associated with the time-of-flight sensor.

6. The apparatus of claim 1, wherein the first set of three-dimensional optical flow data includes a transverse velocity and a z-axis velocity.

7. The apparatus of claim 1, wherein the first realigned image frame corresponds to an intermediate image frame between the first image frame and the second image frame.

8. The apparatus of claim 1, wherein the first realigned image frame corresponds to a successive image frame that is subsequent to the second image frame.

9. The apparatus of claim 1, wherein the at least one processor is further configured to:
determine a distance between an object and an autonomous vehicle based on the second depth map, wherein the time-of-flight sensor is coupled to the autonomous vehicle.

10. A method comprising:
determining a first depth map that is based on a first image frame and a second image frame, wherein the first image frame and the second image frame correspond to a first frame sequence received from a time-of-flight sensor;
calculating, based on the first depth map, a first set of three-dimensional optical flow data between the first image frame and the second image frame;
performing three-dimensional warping of at least one image frame from the first frame sequence using the first set of three-dimensional optical flow data to yield a first realigned image frame; and
determining a second depth map that is based on the first realigned image frame.

11. The method of claim 10, further comprising:
performing three-dimensional warping of at least one image frame from a second frame sequence using the first set of three-dimensional optical flow data to yield a second realigned image frame, wherein the second frame sequence is subsequent to the first frame sequence;
determining a third depth map that is based on the second realigned image frame;
calculating, based on the third depth map, a second set of three-dimensional optical flow data between the second image frame and a third image frame corresponding to the second frame sequence;
performing three-dimensional warping of at least one image frame from the second frame sequence using the second set of three-dimensional optical flow data to yield a third realigned image frame; and
determining a fourth depth map that is based on the third realigned image frame.

12. The method of claim 10, wherein the first image frame and the second image frame correspond to non-adjacent image frames in the first frame sequence.

13. The method of claim 10, wherein the first image frame is associated with a first set of one or more sensor parameters and the second image frame is associated with a second set of the one or more sensor parameters.

14. The method of claim 13, wherein the one or more sensor parameters include at least one of an illumination state associated with the time-of-flight sensor, a phase delay associated with the time-of-flight sensor, and an integration time associated with the time-of-flight sensor.

15. The method of claim 10, wherein the first set of three-dimensional optical flow data includes a transverse velocity and a z-axis velocity.

16. The method of claim 10, wherein the first realigned image frame corresponds to an intermediate image frame between the first image frame and the second image frame.

17. The method of claim 10, wherein the first realigned image frame corresponds to a successive image frame that is subsequent to the second image frame.

18. The method of claim 10, further comprising:
determining a distance between an object and an autonomous vehicle based on the second depth map, wherein the time-of-flight sensor is coupled to the autonomous vehicle.

19. A non-transitory computer-readable media comprising instructions stored thereon which, when executed are configured to cause a computer or processor to:
determine a first depth map that is based on a first image frame and a second image frame, wherein the first image frame and the second image frame correspond to a first frame sequence received from a time-of-flight sensor;

calculate, based on the first depth map, a first set of three-dimensional optical flow data between the first image frame and the second image frame;

perform three-dimensional warping of at least one image frame from the first frame sequence using the first set of three-dimensional optical flow data to yield a first realigned image frame; and determine a second depth map that is based on the first realigned image frame.

20. The non-transitory computer-readable media of claim 19, comprising further instructions configured to cause the computer or the processor to:

receive a third image frame from the time-of-flight sensor, wherein the third image frame corresponds to a second frame sequence received from the time-of-flight sensor;

perform three-dimensional warping of at least one image frame from the second frame sequence using the first set of three-dimensional optical flow data to yield a second realigned image frame;

determine a third depth map that is based on the second realigned image frame;

calculate, based on the third depth map, a second set of three-dimensional optical flow data between the second image frame and the third image frame;

perform three-dimensional warping of at least one image frame from the second frame sequence using the second set of three-dimensional optical flow data to yield a third realigned image frame; and determine a fourth depth map that is based on the third realigned image frame.

* * * * *